United States Patent
Oniwa

(10) Patent No.: US 12,077,155 B2
(45) Date of Patent: Sep. 3, 2024

(54) VEHICLE CONTROL DEVICE, VEHICLE CONTROL METHOD, AND NON-TRANSITORY STORAGE MEDIUM

(71) Applicant: Honda Motor Co., Ltd., Tokyo (JP)

(72) Inventor: Yoshihiro Oniwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 405 days.

(21) Appl. No.: 17/472,682

(22) Filed: Sep. 12, 2021

(65) Prior Publication Data
US 2022/0135031 A1 May 5, 2022

(30) Foreign Application Priority Data
Oct. 29, 2020 (JP) ................................. 2020-181686

(51) Int. Cl.
*B60W 30/12* (2020.01)
*B60W 10/20* (2006.01)

(52) U.S. Cl.
CPC ............ *B60W 30/12* (2013.01); *B60W 10/20* (2013.01); *B60W 2540/18* (2013.01); *B60W 2540/229* (2020.02); *B60W 2552/53* (2020.02); *B60W 2710/20* (2013.01)

(58) Field of Classification Search
CPC .. B60W 30/12; B60W 10/20; B60W 2540/18; B60W 2540/229; B60W 2552/53; B60W 2710/20; B60W 2050/0008; B60W 2710/202; B60W 2710/205; B60W 2710/207; B60W 60/001; B62D 15/025; B62D 6/00
See application file for complete search history.

(56) References Cited

U.S. PATENT DOCUMENTS

| 10,710,632 B2* | 7/2020 | Sato .................... B62D 15/025 |
| 2013/0211676 A1 | 8/2013 | Benyo et al. |
| 2017/0021862 A1 | 1/2017 | Akatsuka et al. |

(Continued)

FOREIGN PATENT DOCUMENTS

| CN | 106314419 | 1/2017 |
| CN | 108973994 | 12/2018 |

(Continued)

OTHER PUBLICATIONS

"Office Action of China Counterpart Application", issued on Jun. 29, 2023, with English translation thereof, p. 1-p. 15.

(Continued)

*Primary Examiner* — Anshul Sood
*Assistant Examiner* — Micah Chuen-Him Cheng
(74) *Attorney, Agent, or Firm* — JCIPRNET

(57) ABSTRACT

Provided are a vehicle control device, a vehicle control method, and a non-transitory storage medium. The vehicle control device includes: an acquisition part, acquiring a positional relationship between a vehicle and a lane; a control part, performing in-lane travel control that causes an actuator included in a steering device of the vehicle to output a force for causing the vehicle to travel in the lane within a range not exceeding an upper limit based on the positional relationship; and an upper limit adjustment part, changing the upper limit in response to an input to an operator that accepts a steering operation performed by an occupant of the vehicle.

8 Claims, 12 Drawing Sheets

(56) References Cited

U.S. PATENT DOCUMENTS

2018/0348779 A1 12/2018 Oniwa
2020/0070826 A1* 3/2020 Watanabe .............. G08G 1/166

FOREIGN PATENT DOCUMENTS

| | | |
|---|---|---|
| JP | 2006264405 | 10/2006 |
| JP | 2010162994 | 7/2010 |
| JP | 2014113929 | 6/2014 |
| JP | 2015020719 | 2/2015 |
| JP | 2017024520 | 2/2017 |
| JP | 2018037100 | 3/2018 |
| JP | 2019051894 | 4/2019 |
| JP | 2019059363 | 4/2019 |
| JP | 2019059808 | 4/2019 |
| JP | 2020069990 | 5/2020 |

OTHER PUBLICATIONS

"Office Action of Japan Counterpart Application" with English translation thereof, issued on Jul. 5, 2022, p. 1-p. 10.
"Office Action of Japan Counterpart Application" with English translation thereof, issued on Dec. 6, 2022, p. 1-p. 8.

* cited by examiner

VEHICLE CONTROL DEVICE, VEHICLE CONTROL METHOD, AND NON-TRANSITORY STORAGE MEDIUM

CROSS-REFERENCE TO RELATED APPLICATIONS

This application claims the priority benefit of Japan Application No. 2020-181686, filed on Oct. 29, 2020. The entirety of the above-mentioned patent application is hereby incorporated by reference herein and made a part of this specification.

BACKGROUND

Technical Field

The disclosure relates to a vehicle control device, a vehicle control method, and a non-transitory storage medium.

Related Art

Conventionally, there has been known a technology of causing an actuator of a steering device to output a force so as to enable a vehicle to travel in a lane. This technology is known as a lane keeping assist system (LKAS) or a lane deviation suppression function, and research is underway on its new forms. Japanese Laid-open No. 2015-20719 describes cancelation of steering request torque since a time during which driver torque is equal to or greater than a threshold exceeds a cancelation time.

The related art is focused on cancelation of a control. In the case where an occupant operates an operator for purposes such as avoiding a curve or an obstacle or changing lanes, if the occupant's operating force on the operator is greater than a force exerted by a system, the operation on the operator may be reflected in a route of the vehicle. However, in the related art, the occupant's intended behavior may not occur as a result of an improper upper limit of the force exerted by the system.

SUMMARY

A vehicle control device according to one aspect of the disclosure includes: an acquisition part, acquiring a positional relationship between a vehicle and a lane; a control part, performing in-lane travel control that causes an actuator included in a steering device of the vehicle to output a force for causing the vehicle to travel in the lane within a range not exceeding an upper limit based on the positional relationship; and an upper limit adjustment part, changing the upper limit in response to an input to an operator that accepts a steering operation performed by an occupant of the vehicle.

A vehicle control method according to another aspect of the disclosure includes the following. A positional relationship between a vehicle and a lane is acquired by a vehicle control device. In-lane travel control that causes an actuator included in a steering device of the vehicle to output a force for causing the vehicle to travel in the lane within a range not exceeding an upper limit is performed by the vehicle control device based on the positional relationship. The upper limit is changed by the vehicle control device in response to an input to an operator that accepts a steering operation performed by an occupant of the vehicle.

A non-transitory storage medium, storing a program according to another aspect of the disclosure causes a processor of a vehicle control device to execute the following. A positional relationship between a vehicle and a lane is acquired. In-lane travel control that causes an actuator included in a steering device of the vehicle to output a force for causing the vehicle to travel in the lane within a range not exceeding an upper limit is performed based on the positional relationship. The upper limit is changed in response to an input to an operator that accepts a steering operation performed by an occupant of the vehicle.

DESCRIPTION OF THE EMBODIMENTS

Figure 1:
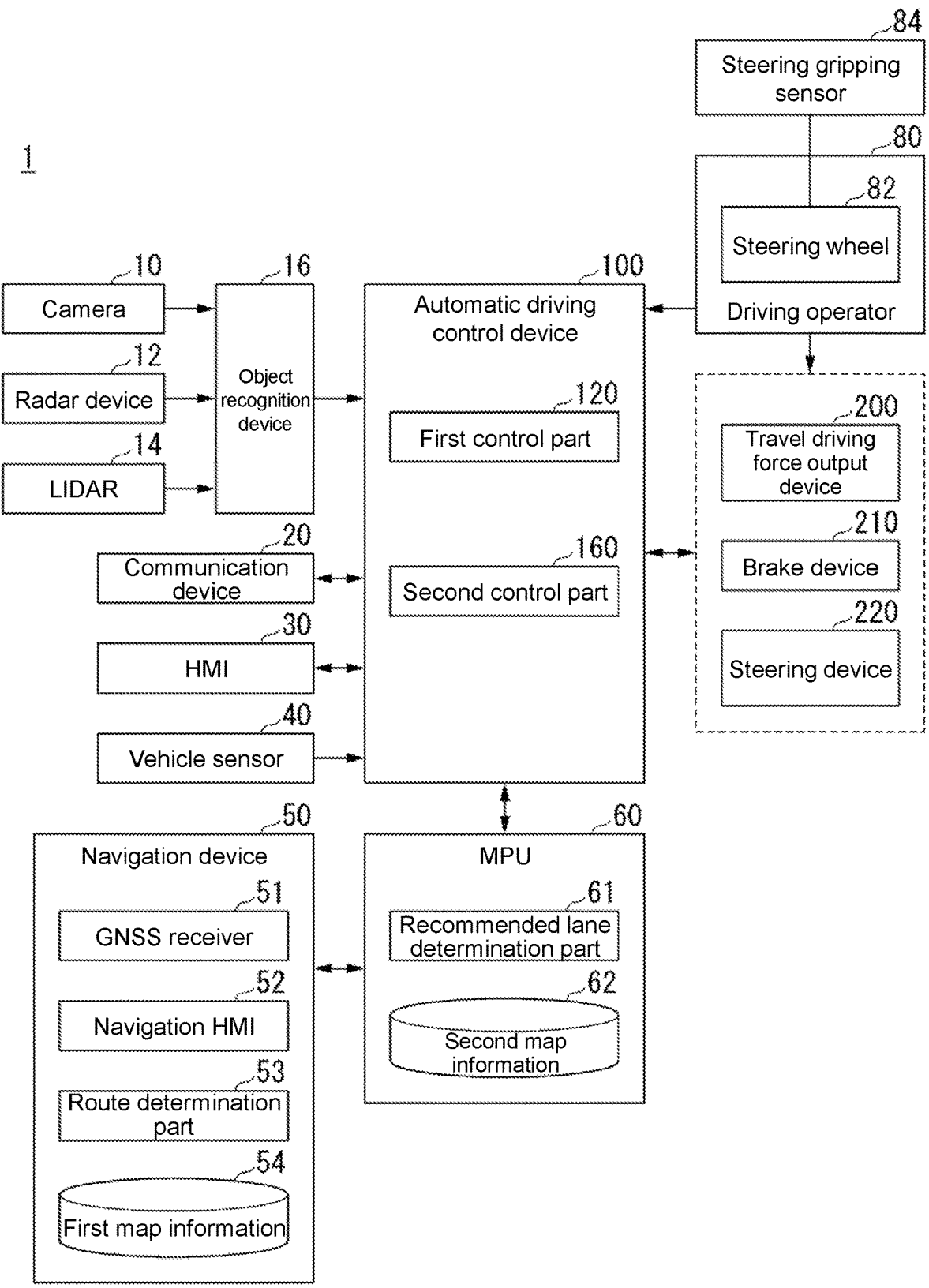
FIG. 1 is a configuration diagram of a vehicle system 1 utilizing a vehicle control device according to a first embodiment.

The disclosure provides a vehicle control device, a vehicle control method, and a program capable of causing vehicle behavior that reliably reflects an intention of an occupant.

A vehicle control device, a vehicle control method, and a program according to the disclosure adopt the following configurations.

(1): A vehicle control device according to one aspect of the disclosure includes: an acquisition part, acquiring a positional relationship between a vehicle and a lane; a control part, performing in-lane travel control that causes an actuator included in a steering device of the vehicle to output a force for causing the vehicle to travel in the lane within a range not exceeding an upper limit based on the positional relationship; and an upper limit adjustment part, changing the upper limit in response to an input to an operator that accepts a steering operation performed by an occupant of the vehicle.

(2): In the aspect (1), the upper limit adjustment part reduces the upper limit to be lower than a specified value in a case where there is an input exceeding a threshold to the operator.

(3): In the aspect (2), the upper limit adjustment part increases a reduction amount of the upper limit as the input to the operator that accepts the steering operation performed by the occupant of the vehicle exceeds the threshold and increases.

(4): In the aspect (3), the control part stops the actuator included in the steering device of the vehicle from outputting the force in a case where the upper limit is reduced to be equal to or lower than a lower limit.

(5) In any one of the aspects (1) to (4), the control part acquires information indicating a gripping state of the operator by the occupant of the vehicle, and is able to execute non-gripping mode control in which the in-lane travel control is performed in a non-gripping state in which the occupant of the vehicle does not grip the operator.

(6): In the aspect (5), the control part does not start the non-gripping mode control in a state in which the upper limit is lower than the specified value.

(7): In the aspect (5) or (6), the upper limit adjustment part reduces the upper limit to be lower than the specified value in a case where there is an input exceeding a threshold to the operator. In a case where the control part is executing the non-gripping mode control, the upper limit adjustment part suppresses the reduction in the upper limit as compared with a case where the control part performs the in-lane travel control in the gripping state in which the occupant of the vehicle grips the operator.

(8): In any one of the aspects (1) to (7), in a case where a road lane marking is unable to be recognized when the acquisition part acquires the positional relationship between the vehicle and the lane, the upper limit adjustment part reduces the upper limit to be less than that of a case where the road lane marking is able to be recognized.

(9): A vehicle control method according to another aspect of the disclosure includes the following. A positional relationship between a vehicle and a lane is acquired by a vehicle control device. In-lane travel control that causes an actuator included in a steering device of the vehicle to output a force for causing the vehicle to travel in the lane within a range not exceeding an upper limit is performed by the vehicle control device based on the positional relationship. The upper limit is changed by the vehicle control device in response to an input to an operator that accepts a steering operation performed by an occupant of the vehicle.

(10): A program according to another aspect of the disclosure causes a processor of a vehicle control device to execute the following. A positional relationship between a vehicle and a lane is acquired. In-lane travel control that causes an actuator included in a steering device of the vehicle to output a force for causing the vehicle to travel in the lane within a range not exceeding an upper limit is performed based on the positional relationship. The upper limit is changed in response to an input to an operator that accepts a steering operation performed by an occupant of the vehicle.

According to the aspects (1) to (10), it is possible to cause vehicle behavior that reliably reflects an intention of the occupant.

According to the aspect (3), it is possible to cause vehicle behavior that more reliably reflects an intention of the occupant.

According to the aspect (6) or (7), in a situation where control power of the in-lane travel control is reduced due to reduction of the upper limit, since the non-gripping mode control is suppressed, it is possible to suppress the occurrence of unintended vehicle behavior.

Hereinafter, embodiments of the vehicle control device, the vehicle control method, and the program of the disclosure are described with reference to the drawings. In a first embodiment, a vehicle control device is described as being applied to a control device that performs so-called automatic driving. In a second embodiment, a vehicle control device is described as being applied to a driving support device on the premise of manual driving.

First Embodiment

[Configuration]

FIG. 1 is a configuration diagram of a vehicle system 1 utilizing a vehicle control device according to the first embodiment. A vehicle on which the vehicle system 1 is installed is, for example, a two-wheeled vehicle, a three-wheeled vehicle, or a four-wheeled vehicle. A drive source of the vehicle is an internal combustion engine such as a diesel engine or a gasoline engine, an electric motor, or a combination thereof. The electric motor operates by using electric power generated by a generator connected to the internal combustion engine or discharged electric power from a secondary battery or a fuel cell.

The vehicle system 1 includes, for example, a camera 10, a radar device 12, a light detection and ranging (LIDAR) device 14, an object recognition device 16, a communication device 20, a human machine interface (HMI) 30, a vehicle sensor 40, a navigation device 50, a map positioning unit (MPU) 60, a driving operator 80, an automatic driving control device 100, a travel driving force output device 200, a brake device 210, and a steering device 220. These devices or machines are connected to each other by a multiplex communication line such as a controller area network (CAN) communication line or a serial communication line, a wireless communication network, or the like. The configuration shown in FIG. 1 is merely an example. A part of the configuration may be omitted or another configuration may be added.

The camera 10 is, for example, a digital camera utilizing a solid-state imaging device such as a charge coupled device (CCD) or a complementary metal oxide semiconductor (CMOS). The camera 10 is attached to any position on the vehicle (hereinafter "host vehicle M") on which the vehicle system 1 is installed. When imaging the front, the camera 10 is attached to an upper part of a front windshield, a back surface of a rearview mirror, or the like. The camera 10, for example, periodically and repeatedly performs imaging around the host vehicle M. The camera 10 may be a stereo camera.

The radar device 12 radiates a radio wave such as a millimeter wave around the host vehicle M, detects a radio wave (reflected wave) reflected by an object, and detects at least a position (distance and orientation) of the object. The radar device 12 is attached to any position on the host vehicle M. The radar device 12 may detect the position and velocity of the object by a frequency modulated continuous wave (FM-CW) method.

The LIDAR device 14 irradiates light (or an electromagnetic wave having a wavelength close to that of light) around the host vehicle M and measures scattered light. The LIDAR device 14 detects a distance to an object based on a time from emission of the light until reception of the light. The irradiation light is, for example, pulsed laser light. The LIDAR device 14 is attached to any position on the host vehicle M.

The object recognition device 16 performs sensor fusion on a detection result of some or all of the camera 10, the radar device 12 and the LIDAR device 14, and recognizes the position, type, velocity or the like of the object. The object recognition device 16 outputs a recognition result to the automatic driving control device 100. The object recognition device 16 may output the detection result of the camera 10, the radar device 12 and the LIDAR device 14 as it is to the automatic driving control device 100. The object recognition device 16 may be omitted from the vehicle system 1.

By utilizing, for example, a cellular network, a Wi-Fi network, Bluetooth®, or dedicated short range communications (DSRC), the communication device 20 communicates with other vehicles existing around the host vehicle M, or communicates with various server devices via a radio base station.

The HMI 30 presents various information to an occupant of the host vehicle M and accepts an input operation performed by the occupant. The HMI 30 includes various display devices, speakers, buzzers, touch panels, switches, keys, or the like.

The vehicle sensor 40 includes a vehicle speed sensor that detects a speed of the host vehicle M, an acceleration sensor that detects acceleration, a yaw rate sensor that detects an angular velocity about a vertical axis, a direction sensor that detects the direction of the host vehicle M, or the like.

The navigation device 50 includes, for example, a global navigation satellite system (GNSS) receiver 51, a navigation HMI 52, and a route determination part 53. The navigation device 50 holds first map information 54 in a storage device such as a hard disk drive (HDD) or a flash memory. The GNSS receiver 51 specifies a position of the host vehicle M based on a signal received from a GNSS satellite. The position of the host vehicle M may be specified or complemented by an inertial navigation system (INS) utilizing an output of the vehicle sensor 40. The navigation HMI 52 includes a display device, a speaker, a touch panel, a key, or the like. The navigation HMI 52 may be partially or wholly used in common with the HMI 30. The route determination part 53, for example, determines a route (hereinafter "route on the map") from the position of the host vehicle M specified by the GNSS receiver 51 (or any position input) to a destination input by the occupant using the navigation HMI 52, with reference to the first map information 54. The first map information 54 is, for example, information in which a road shape is expressed by a link indicating a road and a node connected by the link. The first map information 54 may include a road curvature, point of interest (POI) information, or the like. The route on the map is output to the MPU 60. The navigation device 50 may provide route guidance using the navigation HMI 52 based on the route on the map. The navigation device 50 may be realized by, for example, a function of a terminal device such as a smartphone or a tablet terminal owned by the occupant. The navigation device 50 may transmit a current position and the destination to a navigation server via the communication device 20, and acquire a route equivalent to the route on the map from the navigation server.

The MPU 60 includes, for example, a recommended lane determination part 61, and holds second map information 62 in a storage device such as an HDD or a flash memory. The recommended lane determination part 61 divides the route on the map provided by the navigation device 50 into multiple blocks (for example, divides the route every 100 meters in a vehicle traveling direction), and determines a recommended lane for each block with reference to the second map information 62. The recommended lane determination part 61 determines which lane from the left to travel on. In a case where there is a branch point on the route on the map, the recommended lane determination part 61 determines the recommended lane so that the host vehicle M is able to travel on a reasonable route for proceeding to a branch destination.

The second map information 62 is map information with higher accuracy than the first map information 54. The second map information 62 includes, for example, information on a lane center or information on a lane boundary. The second map information 62 may also include road information, traffic control information, address information (address or zip code), facility information, telephone number information, or the like. The second map information 62 may be updated at any time by the communication device 20 communicating with other devices.

The driving operator 80 includes, for example, a steering wheel 82, as well as an accelerator pedal, a brake pedal, a shift lever, and any other operator. A sensor that detects an operation amount or the presence or absence of an operation is attached to the driving operator 80. A detection result thereof is output to the automatic driving control device 100, or some or all of the travel driving force output device 200, the brake device 210, and the steering device 220. The steering wheel 82 is an example of the "operator that accepts a steering operation performed by an occupant of the vehicle." The operator does not necessarily have an annular shape, and may be in the form of an irregular shaped steering wheel, a joystick, a button, or the like. A steering gripping sensor 84 is attached to the steering wheel 82. The steering gripping sensor 84 is realized by a capacitance sensor or the like, and outputs to the automatic driving control device 100 a signal capable of detecting whether the occupant (driver) is gripping the steering wheel 82 (meaning that the occupant (driver) is in contact with the steering wheel 82 while applying force thereto).

The automatic driving control device 100 includes, for example, a first control part 120 and a second control part 160. The first control part 120 and the second control part 160 are each realized by, for example, a hardware processor such as a central processing unit (CPU) executing a program (software). In addition, some or all of these components may be realized by hardware (circuit part, including circuitry) such as a large scale integration (LSI) circuit or an application-specific integrated circuit (ASIC), a field-programmable gate array (FPGA), or a graphics processing unit (GPU), or may be realized by collaboration between software and hardware. The program may be stored in advance in a storage device (a storage device including a non-transitory storage medium) such as an HDD or a flash memory of the automatic driving control device 100, or may be stored in a removable storage medium such as a DVD or a CD-ROM, and installed in the HDD or the flash memory of the automatic driving control device 100 by attachment of the storage medium (non-transitory storage medium) to a drive device. The automatic driving control device 100 is an example of the "vehicle control device."

Figure 2:
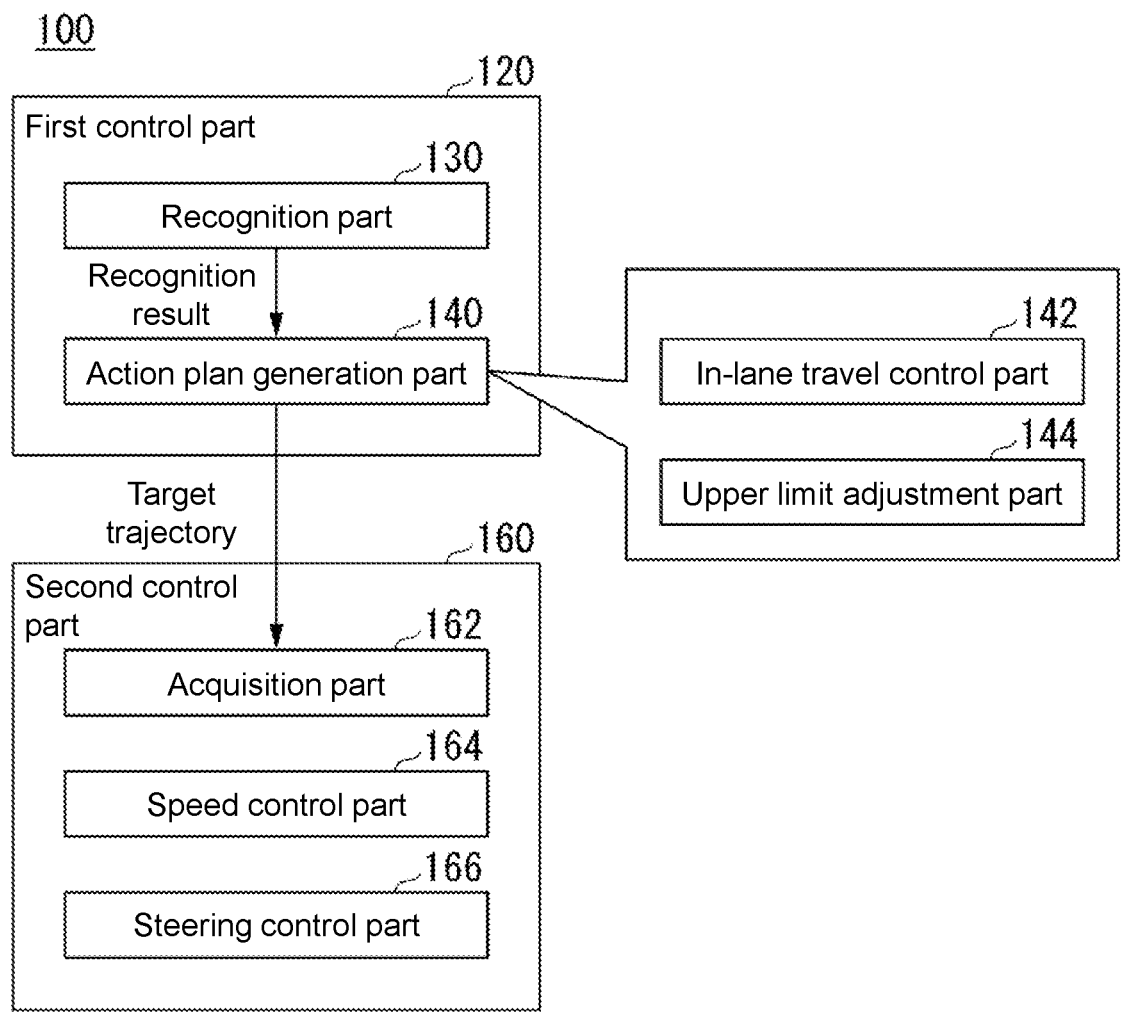
FIG. 2 is a functional configuration diagram of a first control part 120 and a second control part 160.

FIG. 2 is a functional configuration diagram of the first control part 120 and the second control part 160. The first control part 120 includes, for example, a recognition part 130 and an action plan generation part 140. The first control part 120, for example, realizes a function by artificial intelligence (AI) and a function by a pre-given model in parallel. For example, a function of "recognizing an intersection" may be realized by executing intersection recognition by deep learning or the like and recognition based on a pre-given condition (such as a signal that can be pattern matched or a road marking) in parallel, scoring both and evaluating them comprehensively. Accordingly, reliability of automatic driving is ensured.

Based on the information input from the camera 10, the radar device 12, and the LIDAR device 14 via the object recognition device 16, the recognition part 130 recognizes a position and a state such as velocity and acceleration of an object around the host vehicle M. The position of the object is recognized as, for example, a position in absolute coordinates with a representative point (such as the center of gravity or the center of a drive shaft) of the host vehicle M as the origin, and is used for control. The position of the object may be represented by the representative point such as the center of gravity or a corner of the object, or may be represented by an area. The "state" of the object may include the acceleration or jerk, or an "action state" (for example, whether the object is changing lanes or is about to change lanes) of the object.

The recognition part 130 recognizes, for example, a lane (traveling lane) in which the host vehicle M is traveling. For example, the recognition part 130 recognizes the traveling lane by comparing a pattern (for example, an array of solid lines and broken lines) of a road lane marking obtained from the second map information 62 with a pattern of a road lane marking around the host vehicle M recognized from an image captured by the camera 10. The recognition part 130 may recognize the traveling lane by recognizing not only a road lane marking but also a lane boundary (road boundary) including a road lane marking or a road shoulder, a curb, a median strip, a guardrail, or the like. In this recognition, the position of the host vehicle M acquired from the navigation device 50 or an INS processing result may be added. The recognition part 130 also recognizes a stop line, an obstacle, a red light, a tollgate, and any other road event.

The recognition part 130 recognizes the position or posture of the host vehicle M with respect to the traveling lane when recognizing the traveling lane. The recognition part 130 may, for example, recognize a deviation of a reference point of the host vehicle M from the lane center and an angle formed by the traveling direction of the host vehicle M with respect to a line connecting the lane center as a relative position and posture of the host vehicle M with respect to the traveling lane. Alternatively, the recognition part 130 may recognize the position of the reference point of the host vehicle M with respect to any side end (road lane marking or road boundary) of the traveling lane as the relative position of the host vehicle M with respect to the traveling lane.

The action plan generation part 140, in principle, travels in the recommended lane determined by the recommended lane determination part 61, and further generates a target trajectory in which the host vehicle M will automatically (regardless of a driver's operation) travel in the future so as to respond to a situation around the host vehicle M. The target trajectory includes, for example, a speed component. For example, the target trajectory is expressed as a sequence of locations (trajectory points) to be reached by the host vehicle M. A trajectory point is a location to be reached by the host vehicle M for each predetermined travel distance (for example, about several meters) along a road. Apart from that, a target speed and target acceleration for each predetermined sampling time (for example, about zero point several seconds) are generated as a part of the target trajectory. A trajectory point may also be a position to be reached by the host vehicle M at a sampling time point every predetermined sampling time. In this case, information on the target speed or target acceleration is expressed by intervals between the trajectory points.

The action plan generation part 140 may set an automatic driving event in generating the target trajectory. The automatic driving event includes an in-lane travel event, a low-speed following driving event, a lane change event, a branching event, a merging event, a takeover event, or the like. The action plan generation part 140 generates the target trajectory corresponding to an activated event.

The action plan generation part 140 includes an in-lane travel control part 142 and an upper limit adjustment part 144. These functional parts operate in the case of executing the in-lane travel event. The details are described later.

The second control part 160 controls the travel driving force output device 200, the brake device 210 and the steering device 220 so that the host vehicle M passes through the target trajectory generated by the action plan generation part 140 at a scheduled time.

Back to FIG. 2, the second control part 160 includes, for example, an acquisition part 162, a speed control part 164, and a steering control part 166. The acquisition part 162 acquires information on the target trajectory (trajectory point) generated by the action plan generation part 140 and stores it in a memory (not shown). The speed control part 164 controls the travel driving force output device 200 or the brake device 210 based on the speed component associated with the target trajectory stored in the memory. The steering control part 166 controls the steering device 220 based on the target trajectory stored in the memory. Functions of the steering control part 166 are described later.

The travel driving force output device 200 outputs to a driving wheel a travel driving force (torque) for a vehicle to travel. The travel driving force output device 200 includes, for example, a combination of an internal combustion engine, an electric motor, and a transmission or the like, and an electronic control unit (ECU) that controls them. The ECU controls the above configurations according to the information input from the second control part 160 or the information input from the driving operator 80.

The brake device 210 includes, for example, a brake caliper, a cylinder that transmits oil pressure to the brake caliper, an electric motor that causes the cylinder to generate the oil pressure, and a brake ECU. The brake ECU controls the electric motor according to the information input from the second control part 160 or the information input from the driving operator 80, so that brake torque corresponding to a braking operation is output to each wheel. The brake device 210 may include, as a backup, a mechanism for transmitting oil pressure generated by an operation on the brake pedal included in the driving operator 80 to the cylinder via a master cylinder. The brake device 210 is not limited to the configuration described above, and may be an electronically controlled hydraulic brake device that controls an actuator according to the information input from the second control part 160 and transmits the oil pressure of the master cylinder to the cylinder.

Figure 3:
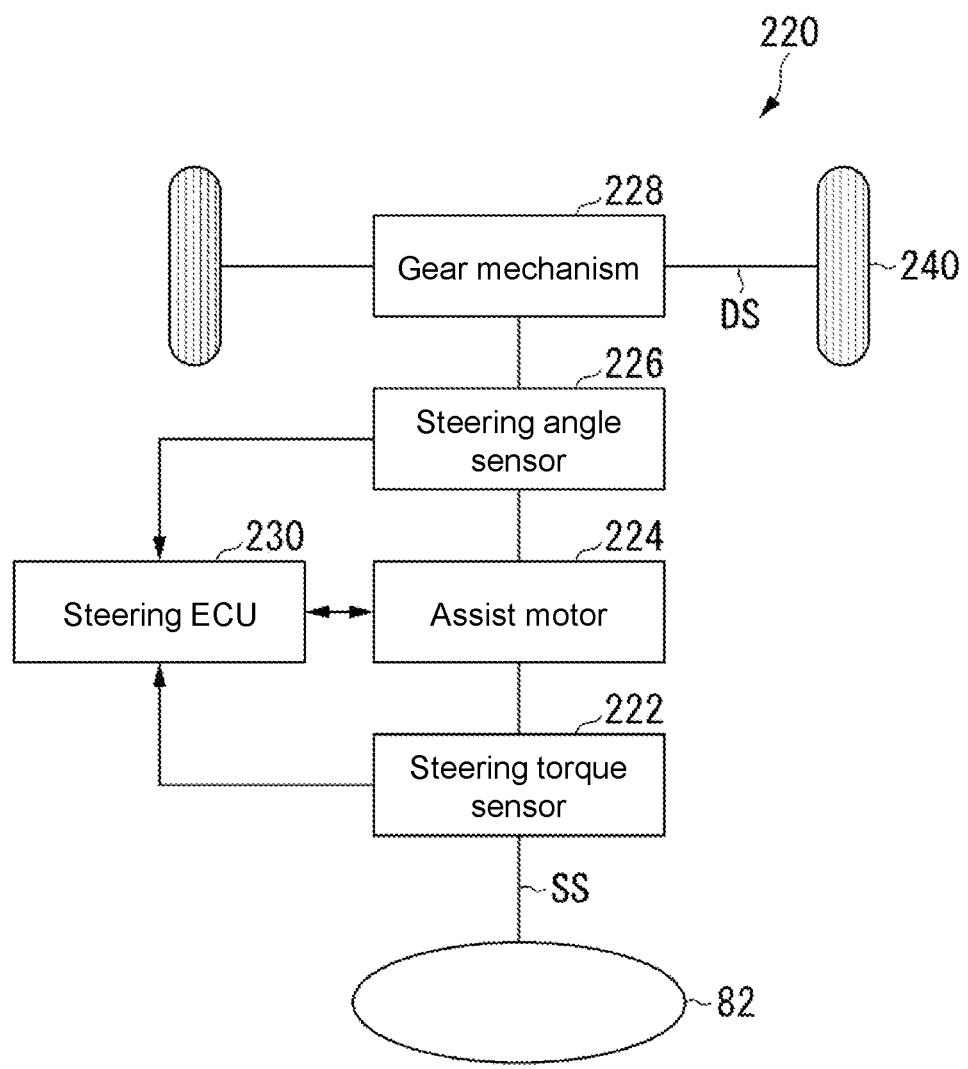
FIG. 3 schematically illustrates a configuration of a steering device 220.

The steering device 220 is an example of the "steering device." FIG. 3 schematically illustrates a configuration of the steering device 220. The steering device 220 is connected to the steering wheel 82 (the steering wheel 82 may also be defined as being included in the steering device 220). The steering device 220 includes a steering torque sensor 222 attached to a steering shaft SS connected to the steering wheel 82, an assist motor 224, a steering angle sensor 226, a gear mechanism 228, and a steering ECU 230. The assist motor 224 is an example of the "actuator." The steering torque sensor 222 detects the direction and magnitude of a force (for example, torque, hereinafter "steering torque") applied to the steering wheel 82 by the occupant. The assist motor 224 outputs torque T to the steering shaft SS. The assist motor 224 may be a linear motor or the like that outputs a straight-ahead force to a drive shaft DS. The steering angle sensor 226 detects a rotation angle θ of the steering shaft SS. The gear mechanism 228 converts rotation of the steering shaft SS into a reciprocating motion of the drive shaft DS, and changes an angle of a wheel 240 connected to the drive shaft DS. The configuration or arrangement, mechanism and the like of the steering device 220 shown in FIG. 3 are merely an example, and the steering device 220 of any configuration may be provided.

[In-Lane Travel Control and Temporary Manual Adjustment]

Hereinafter, the in-lane travel control is described. When the in-lane travel event is activated, the in-lane travel control part 142 sets the target trajectory along the lane center, and sets a target speed to a set speed such as a legal speed. The "lane" referred to herein may include, in addition to an area divided by a road lane marking such as a white line, an area divided by the road shoulder or the median strip on a road having one lane on each side. In the case where there is no road lane marking or the road lane marking is blur and cannot be sufficiently recognized, an assumed lane virtually set based on the position of the road lane marking recognized in the past or the position of a target in the traveling direction of the host vehicle M may be included in the lane. The speed control part 164 controls the travel driving force output device 200 or the brake device 210 so that the host vehicle M travels at the target speed. The steering control part 166 determines a target steering angle θ# based on a degree of deviation between the position of the host vehicle M and the target trajectory, determines a control amount (such as a current and a duty ratio) to be given to the assist motor 224 based on the determined target steering angle θ#, and outputs the control amount to the steering ECU 230 of the steering device 220. For example, the steering control part 166 determines the target steering angle θ# by a combination of feedforward control corresponding to a degree of turning of the target trajectory, and feedback control such as PID control, PI control, and P control for bringing the degree of deviation between the position of the host vehicle M and the target trajectory close to zero. Alternatively (or additionally), the in-lane travel control part 142 may cause the steering control part 166 to determine the target steering angle θ# in a direction away from the road lane marking as the position of the host vehicle M approaches the road lane marking. The steering ECU 230 drives the assist motor 224 according to the control amount given from the steering control part 166. Based on a detected value ST of the steering torque sensor 222, the upper limit adjustment part 144 adjusts an upper limit UT# of later-described system target torque T2#.

Figure 4:
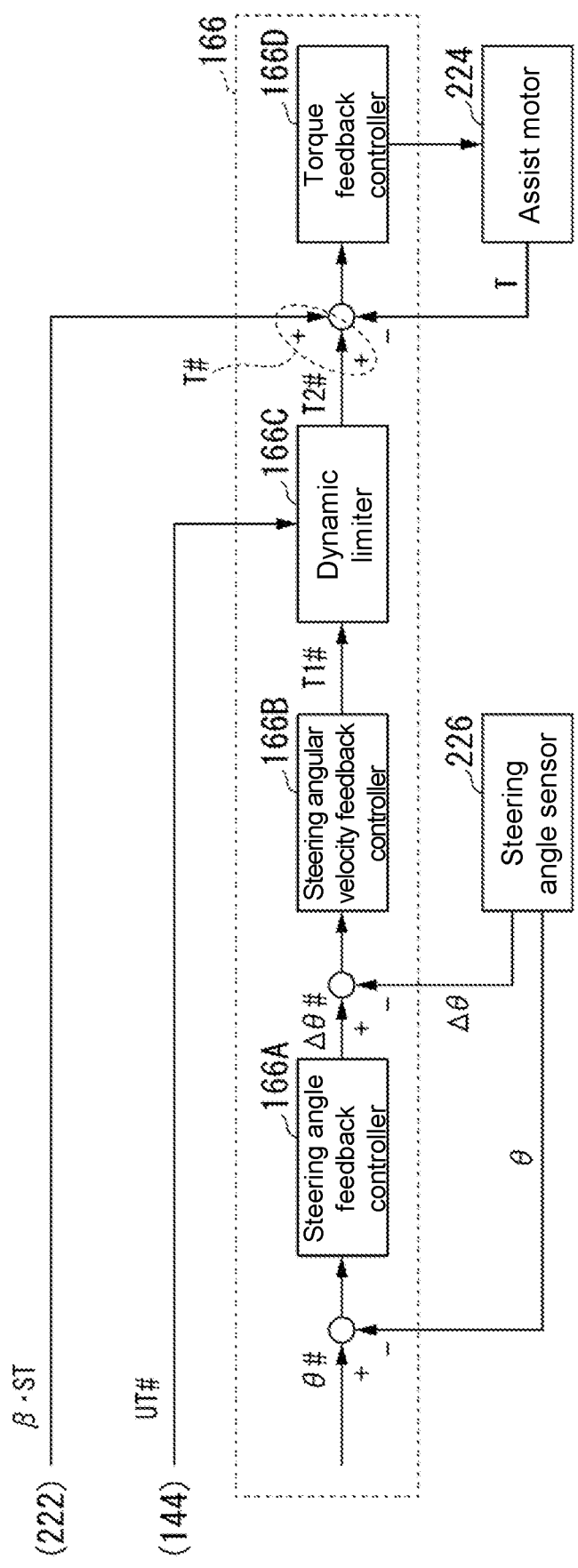
FIG. 4 is a functional configuration diagram of a steering electronic control unit (ECU) 230.

FIG. 4 is a functional configuration diagram of the steering control part 166. The steering control part 166 includes, for example, a steering angle feedback (FB) controller 166A, a steering angular velocity feedback controller 166B, a dynamic limiter 166C and a torque feedback controller 166D.

A deviation (θ#−θ) between the target steering angle θ# output by the steering control part 166 and a steering angle θ input from the steering angle sensor 226 is input to the steering angle feedback controller 166A. The steering angle feedback controller 166A performs feedback control for bringing the deviation (θ#−θ) close to zero, and outputs a target steering angular velocity Δθ# as an operation amount.

A deviation (Δθ#−Δθ) between the target steering angular velocity Δθ# output by the steering angle feedback controller 166A and a steering angular velocity Δθ is input to the steering angular velocity feedback controller 166B. The steering angular velocity Δθ may be obtained by differentiating the detected value θ of the steering angle sensor 226, but an angular velocity sensor may also be provided. The steering angular velocity feedback controller 166B performs the feedback control for bringing the deviation (Δθ#−Δθ) close to zero, and outputs primary target torque T1# as an operation amount.

The dynamic limiter 166C compares the primary target torque T1# input from the steering angular velocity feedback controller 166B with the upper limit UT#. If the primary target torque T1# is smaller, the dynamic limiter 166C outputs the primary target torque T1# as system target torque T2#; if the primary target torque T1# is greater, the dynamic limiter 166C outputs the upper limit UT# as the system target torque T2#. That is, the dynamic limiter 166C outputs a value obtained by limiting (guarding) the primary target torque T1# by the upper limit UT# as the system target torque T2#.

A deviation (T#−T) between target torque T# (which is a sum of β·ST obtained by multiplying the detected value ST of the steering torque sensor 222 by a coefficient β and the system target torque T2#) and the torque T output by the assist motor 224 is input to the torque feedback controller 166D. The coefficient β is a number equal to or greater than 1. The torque T is obtained from a detected value of a current sensor attached to the assist motor 224, or the like. The torque feedback controller 166D performs the feedback control for bringing the deviation (T#−T) close to zero, and outputs a control amount (such as a current and a duty ratio) given to the assist motor 224 as the operation amount. The assist motor 224 generates a steering force in the host vehicle M according to the control amount given by the torque feedback controller 166D. Some of the functions of the steering control part 166 described above may also be functions of the steering ECU 230.

In this way, basically, steering control is performed so as to reduce the deviation between the position of the host vehicle M and the lane center. A combination of the in-lane travel control part 142 and the steering control part 166 is an example of the "control part." Since the force applied to the steering wheel 82 by the occupant is reflected in the target torque T#, it is also possible to adjust a steering direction against the control by the automatic driving control part 100. Specific examples of such a situation include a situation where a curve or an obstacle is to be avoided and a situation where the occupant shifts a lateral position of the host vehicle M to check a front scenery. In such a situation, an adjustment (hereinafter referred to as temporary manual adjustment) to the route of the host vehicle M by an operation of the occupant is enabled while the in-lane travel control is continued.

However, if the signs of the torque β·ST and the system target torque T2# are opposite (that is, the torques are in opposite directions), and the system target torque T2# is excessively large, there is a possibility that the direction of the target torque T# may not be the direction of the force applied to the steering wheel 82 by the occupant, steering may not be performed in a direction intended by the occupant, or the target torque T# may not be sufficiently large. Hence, in the steering control part 166, the system target torque T2# is limited to the upper limit UT# by the dynamic limiter 166C so that the occupant's intention is reflected as much as possible.

However, if the upper limit UT# is a fixed value, since the force of the occupant varies from person to person, there is also a concern that the temporary manual adjustment may not be activated unless a large force is applied. Therefore, in the upper limit adjustment part 144, the upper limit UT# is dynamically adjusted by performing the processing as follows.

[Upper Limit Adjustment (1)]

The upper limit adjustment part 144 reduces the upper limit UT# to be lower than a specified value UT1 in a case where there is an input exceeding a threshold to the steering wheel 82. For example, the upper limit adjustment part 144 increases a reduction amount of the upper limit UT# as the force (the detected value ST of the steering torque sensor 222) applied to the steering wheel 82 exceeds a threshold Th1 and increases. The input to the steering wheel 82 is not necessarily recognized (measured) by torque as described above. For example, a displacement amount of the steering wheel 82 may be recognized (measured) as the input to the steering wheel 82.

Figure 5:
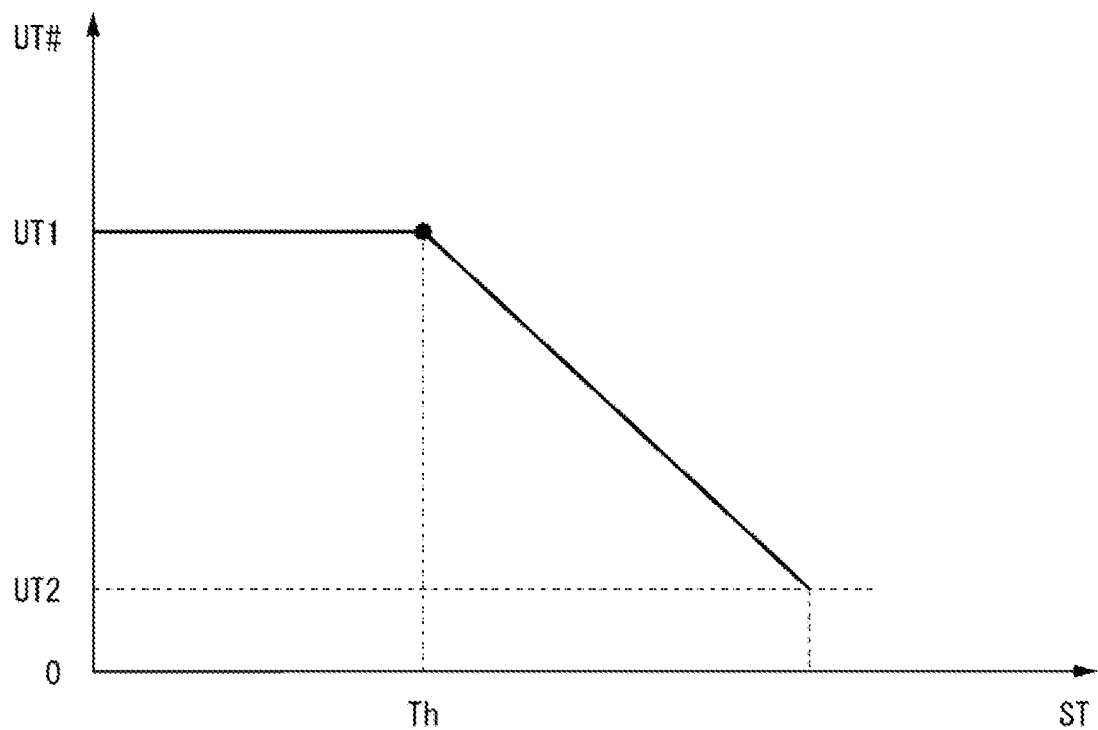
FIG. 5 is a diagram (No. 1) for describing processing content of an upper limit adjustment part 144.

FIG. 5 is a diagram (No. 1) for describing the processing content of the upper limit adjustment part 144. As shown in the figure, in the case where the detected value ST of the steering torque sensor 222 is equal to or less than the threshold Th1, the upper limit adjustment part 144 sets the upper limit UT# to the specified value UT1. When the detected value ST exceeds the threshold Th1, the upper limit adjustment part 144 reduces the upper limit UT# as the detected value ST increases. Although in the figure, as the detected value ST increases, the upper limit UT# is reduced in a linear manner, the upper limit UT# may also be reduced in a curved or stepped manner. The upper limit adjustment part 144 determines a newly set upper limit UT# by reading map or table data held in the memory that show characteristics shown in FIG. 5. Accordingly, if the detected value ST of the steering torque sensor 222 is large, that is, if it is presumed that the occupant has a strong will and desires the temporary manual adjustment, the reduction amount of the upper limit UT# can be increased and the operation of the occupant on the steering wheel 82 can be easily reflected in the route of the host vehicle M. In the case where the upper limit UT# is lower than the specified value UT1, the upper limit adjustment part 144 may notify the occupant of the same using the HMI 30. As mentioned above, the lane may include a lane in the case where the road lane marking is recognized and a lane (such as the lane divided by the road shoulder or the median strip, or the assumed lane) in the case where the road lane marking is not recognized. In that case, the upper limit adjustment part 144 may cause the specified value UT1 in the case where the road lane marking is not recognized to be smaller than the specified value UT1 in the case where the road lane marking is recognized. Accordingly, if there is low certainty about a lane position, control can be relaxed and the occupant's intention can be reliably reflected in the behavior of the host vehicle M.

The in-lane travel control part 142 may stop the in-lane travel control in the case where the upper limit UT# is reduced to be equal to or lower than a lower limit UT2. In this case, the in-lane travel control part 142 instructs the second control part 160 to gradually shift from automatic control to manual driving based on the target trajectory. The term "gradually" means "over time" and does not mean changing at once. The in-lane travel control part 142 may make a determination for comparing the upper limit UT# with the lower limit UT2, or may alternatively make a determination for comparing the detected value ST of the steering torque sensor 222 with an upper limit threshold Th2 corresponding to the lower limit UT2.

The in-lane travel control part 142 detects whether the occupant is gripping the steering wheel 82 based on a detected value input from the steering gripping sensor 84. The in-lane travel control part 142 may execute both the in-lane travel control (hereinafter "gripping mode control") in a state in which the occupant is gripping the steering wheel 82 and the in-lane travel control (hereinafter "non-gripping mode control") in a state in which the occupant is not gripping the steering wheel 82. Since the non-gripping mode control is performed in a state in which automatic control is of high relative importance and the occupant may panic if suddenly switching to manual driving, one or both of the following Limitation 1 and Limitation 2 may be imposed.

(Limitation 1) The in-lane travel control part 142 does not start the non-gripping mode control in a state in which the upper limit UT# is lower than the specified value UT1. There may be various types of start triggers for the non-gripping mode control. For example, in addition to the fact that the occupant no longer grips the steering wheel 82, the fact that the state of the host vehicle M meets start conditions (such as motorway, medium or higher speed, no traffic jam, and it is detected by an in-car camera that the occupant in a driver's seat is awake and facing forward), the fact that a predetermined start operation (including voice operation) is performed, or the like, may be set as a start trigger for the non-gripping mode control. Even if these start triggers have occurred, the in-lane travel control part 142 does not start the non-gripping mode control in the state in which the upper limit UT# is lower than the specified value UT1, and notifies the occupant to grip the steering wheel 82 using the HMI 30. In the case where the steering wheel 82 is not gripped despite the notification, the in-lane travel control part 142 may stop the in-lane travel control.

(Limitation 2) In the case where the non-gripping mode control is being executed, the upper limit adjustment part 144 suppresses reduction of the upper limit UT# as compared with the case where the gripping mode control is being executed. For example, in the case where the non-gripping mode control is being executed, as compared with the case where the gripping mode control is being executed, the upper limit adjustment part 144 may suppress reduction of the upper limit UT# by raising the threshold Th1 or by reducing a reduction rate of the upper limit UT# with respect to an increase in the detected value ST of the steering torque sensor 222 after the detected value ST exceeds the threshold Th1.

By doing so, it is possible to suppress the non-gripping mode control from being performed in a state in which the upper limit UT# is reduced, that is, a state in which the temporary manual adjustment is likely to be performed. The force applied to the steering wheel 82 does not only occur in the case where the occupant's operation is performed, but also occurs in the cases such as where the host vehicle M gets over a step and where the host vehicle M is traveling on a curve. When the upper limit UT# is reduced while the occupant has their hand off the steering wheel 82, in the case where a rotational force is generated in the steering wheel 82 due to a vibration generated in the host vehicle M or lateral acceleration, there is a possibility that the temporary manual adjustment may be activated. In an embodiment, by imposing the limitations as described above on the non-gripping mode control, it is possible to suppress unexpected activation of temporary manual adjustment. In the Limitation 2, the reason for not completely preventing reduction of the upper limit UT# in the case where the non-gripping mode control is being executed is that the possibility that the detected value of the steering gripping sensor 84 may be delayed and transmitted to the automatic driving control device 100 is taken into consideration.

Figure 6:
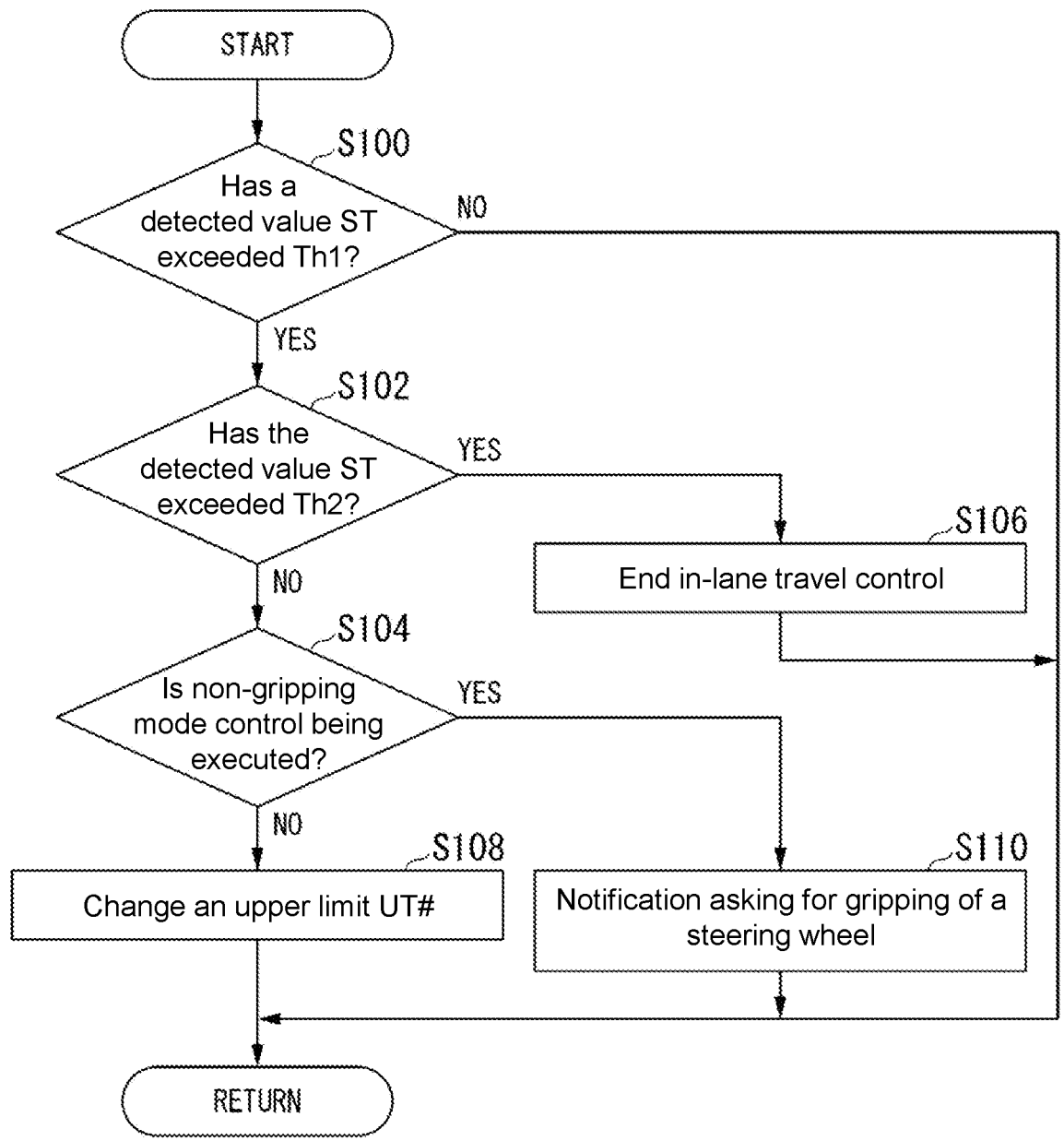
FIG. 6 is a flowchart (No. 1) showing an example of a flow of processing executed by an automatic driving control device 100 of the first embodiment.

FIG. 6 is a flowchart (No. 1) showing an example of a flow of processing executed by the automatic driving control device 100 of the first embodiment. Firstly, the upper limit adjustment part 144 determines whether the detected value ST of the steering torque sensor 222 has exceeded the threshold Th1 (step S100). If it is determined that the detected value ST has not exceeded the threshold Th1, one routine of the present flowchart ends.

If it is determined that the detected value ST has exceeded the threshold Th1, the in-lane travel control part 142 determines whether the detected value ST has exceeded the upper limit threshold Th2 (step S102). If it is determined that the detected value ST has exceeded the upper limit threshold Th2, the in-lane travel control part 142 ends the in-lane travel control (step S106). The upper limit threshold Th2 is a value greater than the threshold Th1.

If it is determined that the detected value ST has not exceeded the upper limit threshold Th2, the upper limit adjustment part 144 determines whether the non-gripping mode control is in execution (step S104). If it is determined that the non-gripping mode control is not in execution, the upper limit adjustment part 144 changes the upper limit UT# (step S108). If it is determined that the non-gripping mode control is in execution, the in-lane travel control part 142 notifies the occupant to grip the steering wheel 82 using the HMI 30 (step S110).

By adjusting the upper limit UT# in this way, when a relatively strong force is applied to the steering wheel 82, since the system target torque T2# is quickly limited by reduction of the upper limit UT#, the temporary manual adjustment becomes relatively effective, and the behavior of the host vehicle M that reliably reflects the occupant's intention can be generated.

[Upper Limit Adjustment (2)]

Hereinafter, a temporal change in the upper limit UT# when the upper limit UT# is adjusted is described. Although the upper limit adjustment part 144 determines a target value for changing the upper limit UT# based on the characteristics shown in FIG. 5, instead of immediately changing the upper limit UT# to the target value, the upper limit adjustment part 144 gradually changes the upper limit UT# to the target value as time passes. In this case, the upper limit adjustment part 144 switches a change rate of the upper limit UT# according to a change of state of the steering wheel 82.

For example, the upper limit adjustment part 144, after reducing the upper limit UT# due to the detected value ST of the steering torque sensor 222 exceeding the threshold Th, returns the upper limit UT# to the specified value UT1 in the case where the force applied to the steering wheel 82, represented by the detected value ST of the steering torque sensor 222, is mitigated to a predetermined degree. The expression "the force is mitigated to a predetermined degree" means that, for example, the detected value ST has become zero, or has become less than a threshold close to zero (has approached zero). Alternatively, the expression "the force is mitigated to a predetermined degree" may mean that the detected value ST exceeding the threshold Th1 has become less than a reference value obtained by multiplying the threshold Th1 by a coefficient of less than 1.

Figure 7:
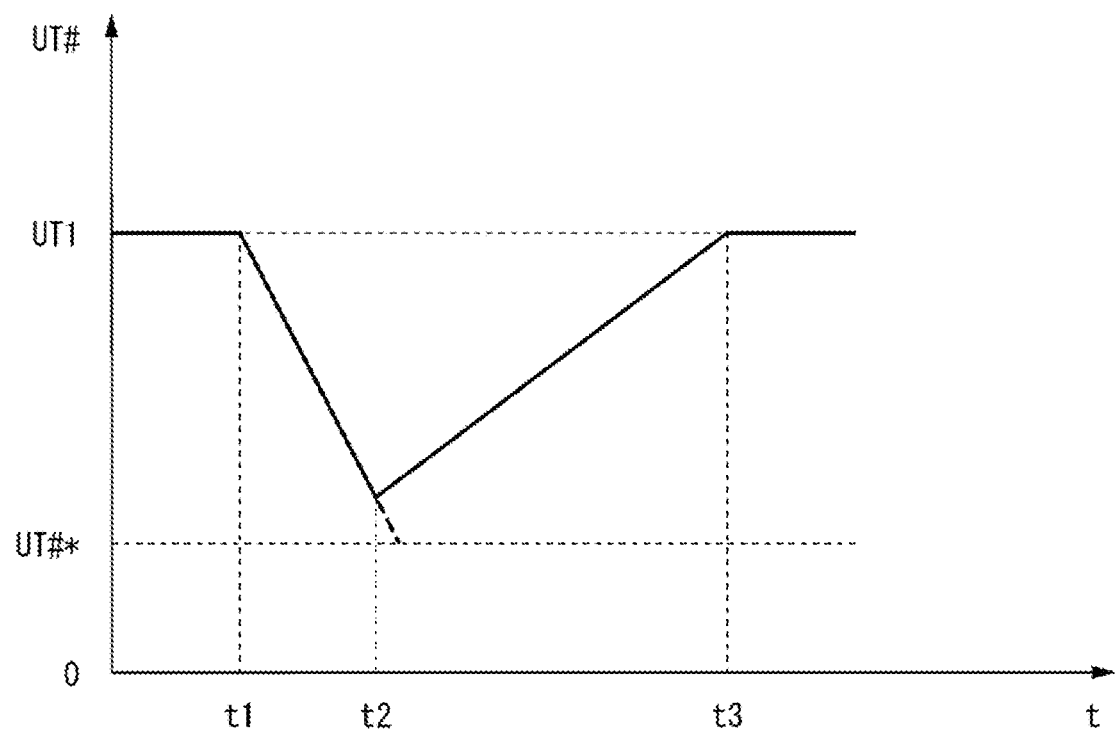
FIG. 7 is a diagram (No. 2) for describing the processing content of the upper limit adjustment part 144.

More specifically, the upper limit adjustment part 144 causes a reduction speed of the upper limit UT# when the upper limit UT# is lower than the specified value UT1 to be greater than a rising speed of the upper limit UT# when the upper limit UT# is returned to the specified value UT1. In the present specification, "speed" is a scalar and takes only a positive value. FIG. 7 is a diagram (No. 2) for describing the processing content of the upper limit adjustment part 144. This figure shows a temporal change in the upper limit UT# in a situation where the temporary manual adjustment is performed and is ended. At time t1, since the detected value ST of the steering torque sensor 222 exceeds the threshold Th, the upper limit adjustment part 144 reduces the upper limit UT# toward the target value (herein referred to as UT#*) of the upper limit UT# obtained according to the characteristics of FIG. 5 at a predetermined reduction speed V1. At time t2 before the upper limit UT# reaches the target value UT#*, the force applied to the steering wheel 82, represented by the detected value ST of the steering torque sensor 222, is mitigated to a predetermined degree. In this case, the upper limit adjustment part 144 stops reducing the upper limit UT#, raises the upper limit UT# at a predetermined rising speed V2, and returns the upper limit UT# to the specified value UT1. The upper limit adjustment part 144 causes the reduction speed V1 of the upper limit UT# during a period from time t1 to time t2 to be greater than the rising speed V2 of the upper limit UT# during a period from time t2 to time t3 (V1>V2). Accordingly, the occurrence of behavior of the host vehicle M unintended by the occupant due to a sudden return of the upper limit UT# to the original specified value UT1 can be suppressed. In addition, if the temporary manual adjustment has been performed once, since it is predicted that the temporary manual adjustment is very likely to be performed again in the near future, the upper limit UT# can be prepared therefor. According to the above, the change rate of the upper limit UT# can be appropriately adjusted.

Figure 8:
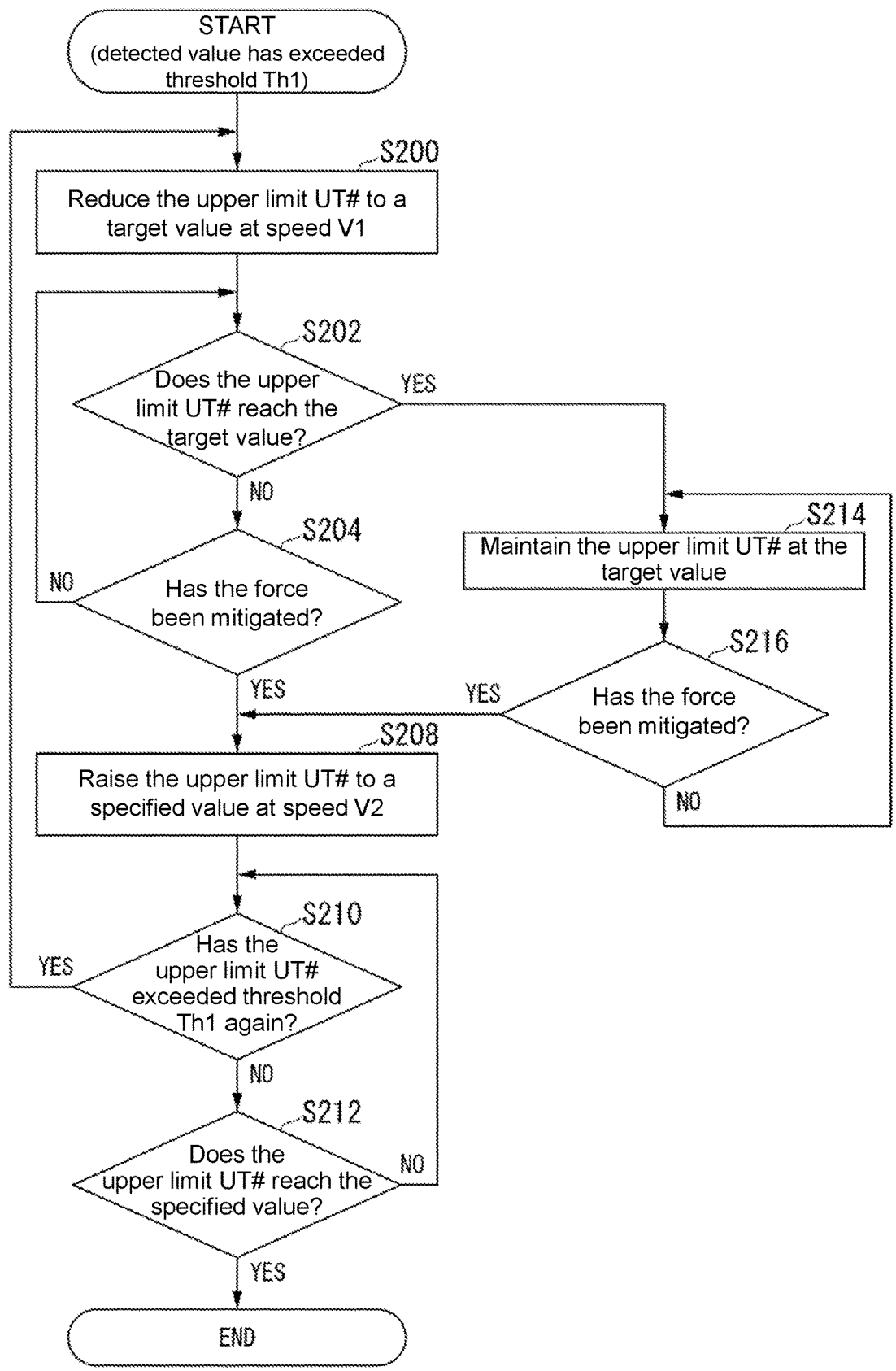
FIG. 8 is a flowchart (No. 2) showing an example of a flow of processing executed by the automatic driving control device 100 of the first embodiment.

FIG. 8 is a flowchart (No. 2) showing an example of a flow of processing executed by the automatic driving control device 100 of the first embodiment. The processing of the present flowchart shows the processing corresponding to a passage of time after the processing of step S108 of FIG. 6 is started.

Firstly, the upper limit adjustment part 144 starts to reduce the upper limit UT# to the target value UT#* at the reduction speed V1 (step S200). Next, the upper limit adjustment part 144 determines whether the upper limit UT# has reached the target value UT#* (step S202). If it is determined that the upper limit UT# has not reached the target value UT#*, the upper limit adjustment part 144 determines whether the force applied to the steering wheel 82 has been mitigated to a predetermined degree (step S204). If it is determined that the force applied to the steering wheel 82 has not been mitigated to the predetermined degree, the upper limit adjustment part 144 returns the processing to step S202.

If it is determined that the force applied to the steering wheel 82 has been mitigated to the predetermined degree, the upper limit adjustment part 144 raises the upper limit UT# to the specified value UT1 at the rising speed V2 (step S208). Next, the upper limit adjustment part 144 determines whether the upper limit UT# has exceeded the threshold Th1 again (step S210). If it is determined that the upper limit UT# has exceeded the threshold Th1 again, the upper limit adjustment part 144 returns the processing to step S200. If it is determined that the upper limit UT# has not exceeded the threshold Th1, the upper limit adjustment part 144 determines whether the upper limit UT# has reached the specified value UT1 (step S212). If it is determined that the upper limit UT# has not reached the specified value UT1, the upper limit adjustment part 144 returns the processing to step S210; if it is determined that the upper limit UT# has reached the specified value UT1, the upper limit adjustment part 144 ends the processing of the present flowchart.

If it is determined in step S202 that the upper limit UT# has reached the target value UT#*, the upper limit adjustment part 144 maintains the upper limit UT# at the target value UT#* (step S214). Next, the upper limit adjustment part 144 determines whether the force applied to the steering wheel 82 has been mitigated to the predetermined degree (step S216). If it is determined that the force applied to the steering wheel 82 has not been mitigated to the predetermined degree, the upper limit adjustment part 144 returns the processing to step S214. If it is determined that the force applied to the steering wheel 82 has been mitigated to the predetermined degree, the upper limit adjustment part 144 raises the upper limit UT# to the specified value UT1 at the rising speed V2 (step S208).

By such processing, the automatic driving control device 100 of the first embodiment is able to appropriately adjust the change rate of the upper limit.

[Upper Limit Adjustment (3)]

In the case where the in-lane travel control part 142 has decided to stop the in-lane travel control, regardless of the detected value ST of the steering torque sensor 222, the upper limit adjustment part 144 gradually changes the upper limit UT# to the target value as time passes, and switches the change rate of the upper limit UT# according to a change of state of the steering wheel 82. In the case such as where the host vehicle M deviates from the lane for some reason (for example, at least one wheel crosses a road lane marking and enters the adjacent lane), and the occupant's operation on the steering wheel 82 is switched to manual driving by operating a switch or the like, the in-lane travel control part 142 stops the in-lane travel control. In this case, the upper limit adjustment part 144 reduces a degree of system intervention by gradually reducing the upper limit UT#, and realizes a natural shift to manual driving (fade-out of the in-lane travel control). The upper limit adjustment part 144 causes the reduction speed of the upper limit UT# during a period before a timing at which the steering wheel 82 starts to be displaced (rotated) regardless of the in-lane travel control to be greater than the reduction speed of the upper limit UT# during a period after the above timing. Based on a signal from the steering gripping sensor 84 that indicates a gripping state of the steering wheel 82 by the occupant of the vehicle, the upper limit adjustment part 144 recognizes whether the occupant is gripping the steering wheel 82, and switches an adjustment method of the upper limit UT# based on a recognition result. The details thereof are hereinafter described.

Figure 9:
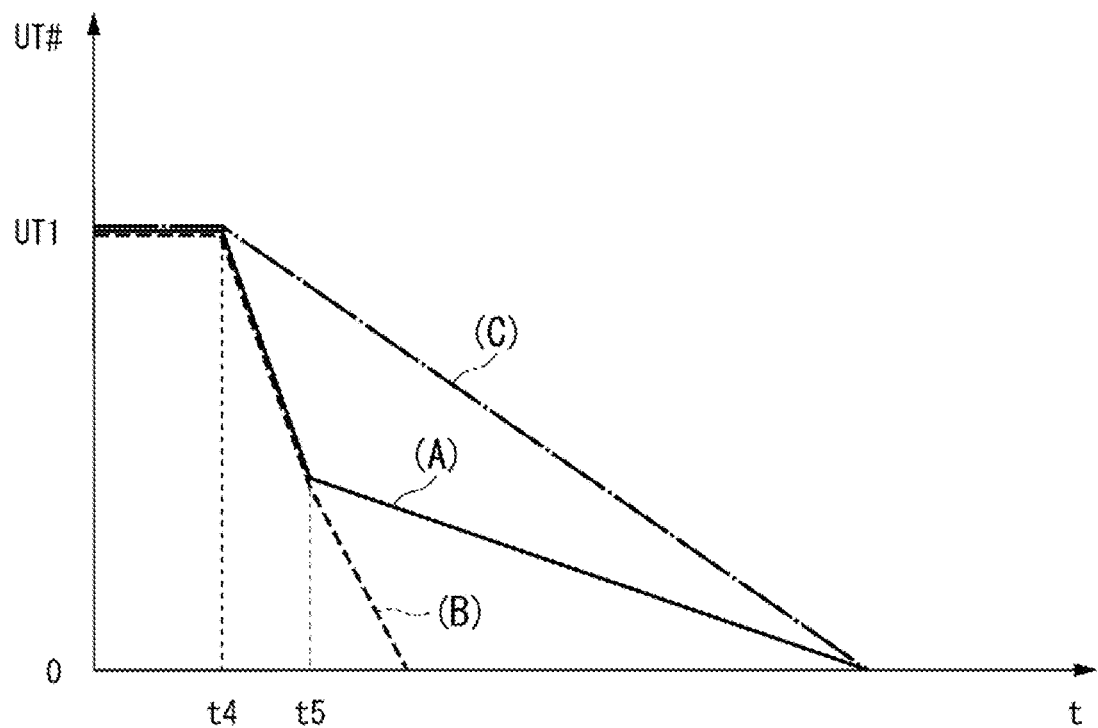
FIG. 9 is a diagram (No. 3) for describing the processing content of the upper limit adjustment part 144.

FIG. 9 is a diagram (No. 3) for describing the processing content of the upper limit adjustment part 144. This figure shows a temporal change in the upper limit UT# in a situation where the in-lane travel control is stopped.

Firstly, a change (A) in the figure is described. The change (A) indicates a temporal change in the upper limit UT# in the case where the occupant is not gripping the steering wheel 82. Since a stop trigger for the in-lane travel control occurs at time t4, the in-lane travel control part 142 decides to stop the in-lane travel control. The information on stop of the in-lane travel control is transmitted to the upper limit adjustment part 144. The upper limit adjustment part 144 reduces the upper limit UT# at a predetermined reduction speed V3. At time t4 when the upper limit UT# becomes zero, the detected value of the steering angle sensor 226 changes regardless of the control by the in-lane travel control part 142 (that is, the steering wheel 82 connected to the steering shaft moves). In this case, the upper limit adjustment part 144 reduces the upper limit UT# to zero at a predetermined reduction speed V4. The upper limit adjustment part 144 causes the reduction speed V3 of the upper limit UT# during a period from time t4 to time t5 to be greater than the reduction speed V4 of the upper limit UT# during a period from time t5 onward (V3>V4). Accordingly, the upper limit UT# is quickly stopped immediately after the in-lane travel control is stopped and a natural shift to manual driving is realized. Also, by keeping the degree of system intervention during a subsequent period just in case, it can be prevented that the in-lane travel control suddenly completely stops and behavior of the host vehicle M unintended by the occupant occurs.

A change (B) in FIG. 9 indicates a temporal change in the upper limit UT# in the case where the occupant is gripping the steering wheel 82. The change (B) is the same as the change (A) until time t5. During a period from time t5 onward, the upper limit adjustment part 144 reduces the upper limit UT# to zero at a predetermined reduction speed V5. The upper limit adjustment part 144 causes the reduction speed V5 of the upper limit UT# during the period from time t5 onward to be greater than the reduction speed V4 in the case where the occupant is not gripping the steering wheel 82 (reduction speed V5>reduction speed V4). The reduction speed V5 is, for example, a value equal to or less than the reduction speed V3. The upper limit adjustment part 144 may cause the reduction speed V1 of the upper limit UT# when the upper limit UT# is reduced due to the fact that the detected value ST of the steering torque sensor 222 exceeds the threshold Th to be different from the reduction speed V3 of the upper limit UT# in the case where the in-lane travel control is stopped. For example, it may be set that the reduction speed V3 is greater than the reduction speed V1. Accordingly, if the occupant is gripping the steering wheel 82, it is presumed that preparation for switching to manual driving is ready. Therefore, it is possible to relatively quickly reduce the upper limit UT# and switch to manual driving.

A change (C) in FIG. 9 is shown for comparison and indicates a temporal change in the upper limit UT# in the case where a reduction speed of the upper limit UT# is constant in a situation where the in-lane travel control is stopped. When control is performed based on this change, the occupant may feel troubled since the degree of system intervention is hardly reduced. In this way, by switching between the changes (A) and (B) and performing control, the change rate of the upper limit can be appropriately adjusted.

Figure 10:
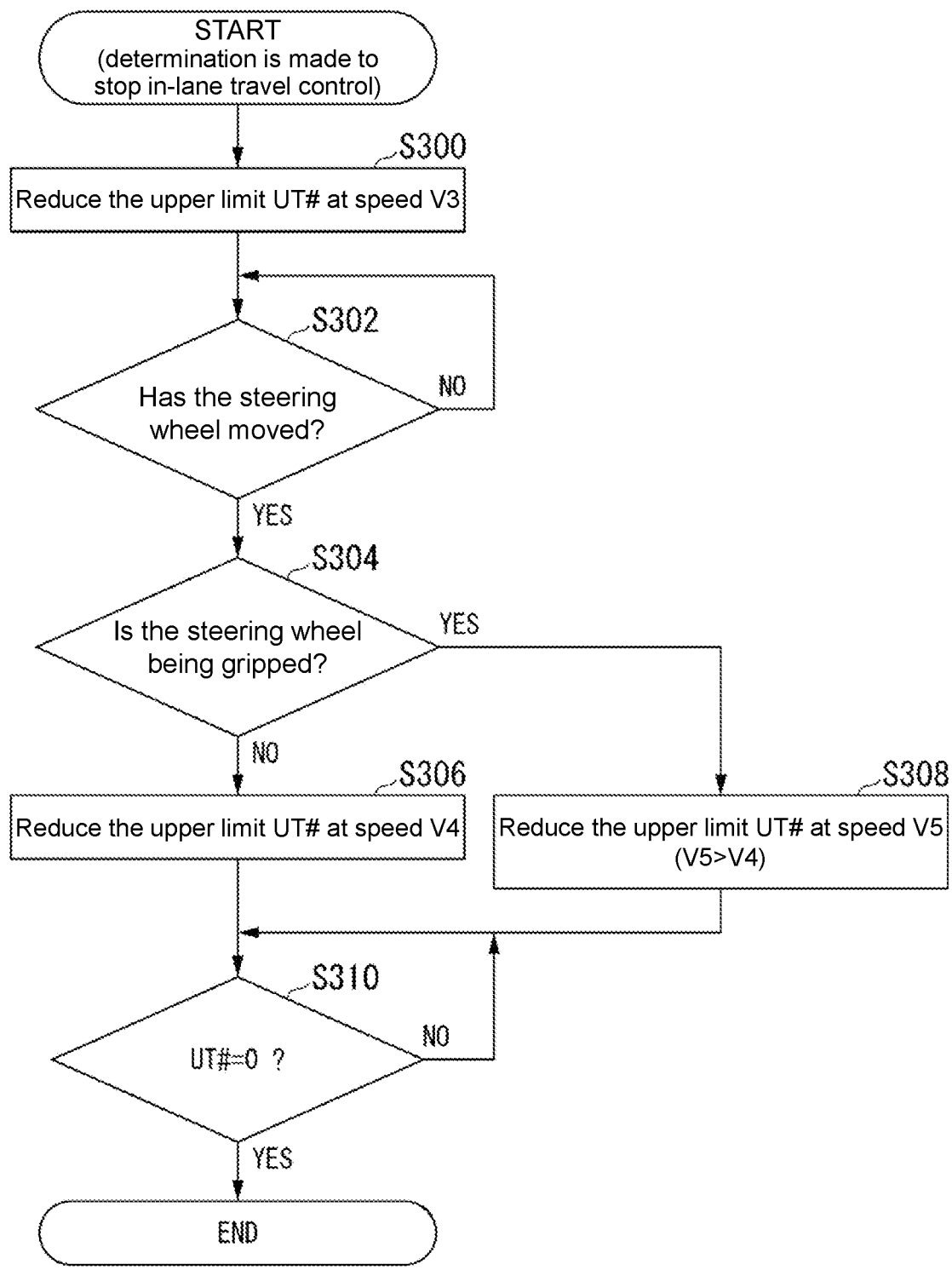
FIG. 10 is a flowchart (No. 3) showing an example of a flow of processing executed by the automatic driving control device 100 of the first embodiment.

FIG. 10 is a flowchart (No. 3) showing an example of a flow of processing executed by the automatic driving control device 100 of the first embodiment. The processing of the present flowchart is started when the in-lane travel control part 142 decides to stop the in-lane travel control.

Firstly, the upper limit adjustment part 144 starts to reduce the upper limit UT# at the reduction speed V3 (step S300). Next, the upper limit adjustment part 144 determines whether the steering wheel 82 has moved (step S302). If it is determined that the steering wheel 82 has moved, the upper limit adjustment part 144 determines whether the occupant is gripping the steering wheel 82 (step S304).

If it is determined that the occupant is not gripping the steering wheel 82, the upper limit adjustment part 144 starts to reduce the upper limit UT# at the reduction speed V4 (step S306). If it is determined that the occupant is gripping the steering wheel 82, the upper limit adjustment part 144 starts to reduce the upper limit UT# at the reduction speed V5 (step S308). Then, the upper limit adjustment part 144 waits for the upper limit UT# to fall and reach zero (step S310), and ends the processing of the present flowchart.

[Upper Limit Adjustment (4)]

Similarly to the upper limit adjustment (3), in the case where the in-lane travel control part 142 has decided to stop the in-lane travel control when the host vehicle M is traveling on a curve, the upper limit adjustment part 144 gradually reduces the upper limit UT# as time passes and reduces the reduction speed of the upper limit UT# during a period after a timing at which centrifugal force due to the curve is commensurate with the upper limit UT# to be less than that during a period before the above timing. The fact that the host vehicle M is traveling on a curve may be detected by a comparison between the second map information 62 and a positioning result from the GNSS receiver 51, or by an analysis of the shape of a white line portion in an image of the camera 10, or with reference to lateral acceleration detected by an acceleration sensor. Similarly, the centrifugal force due to the curve can be calculated or estimated based on the above various information. To be exact, the expression "centrifugal force due to the curve is commensurate with the upper limit UT#" means "lateral acceleration generated by outputting the upper limit UT# is commensurate with the centrifugal force." The action in this case is the same as that replaced with "centrifugal force due to the curve is commensurate with the upper limit UT#" at time t5 in FIG. 9.

Figure 11:
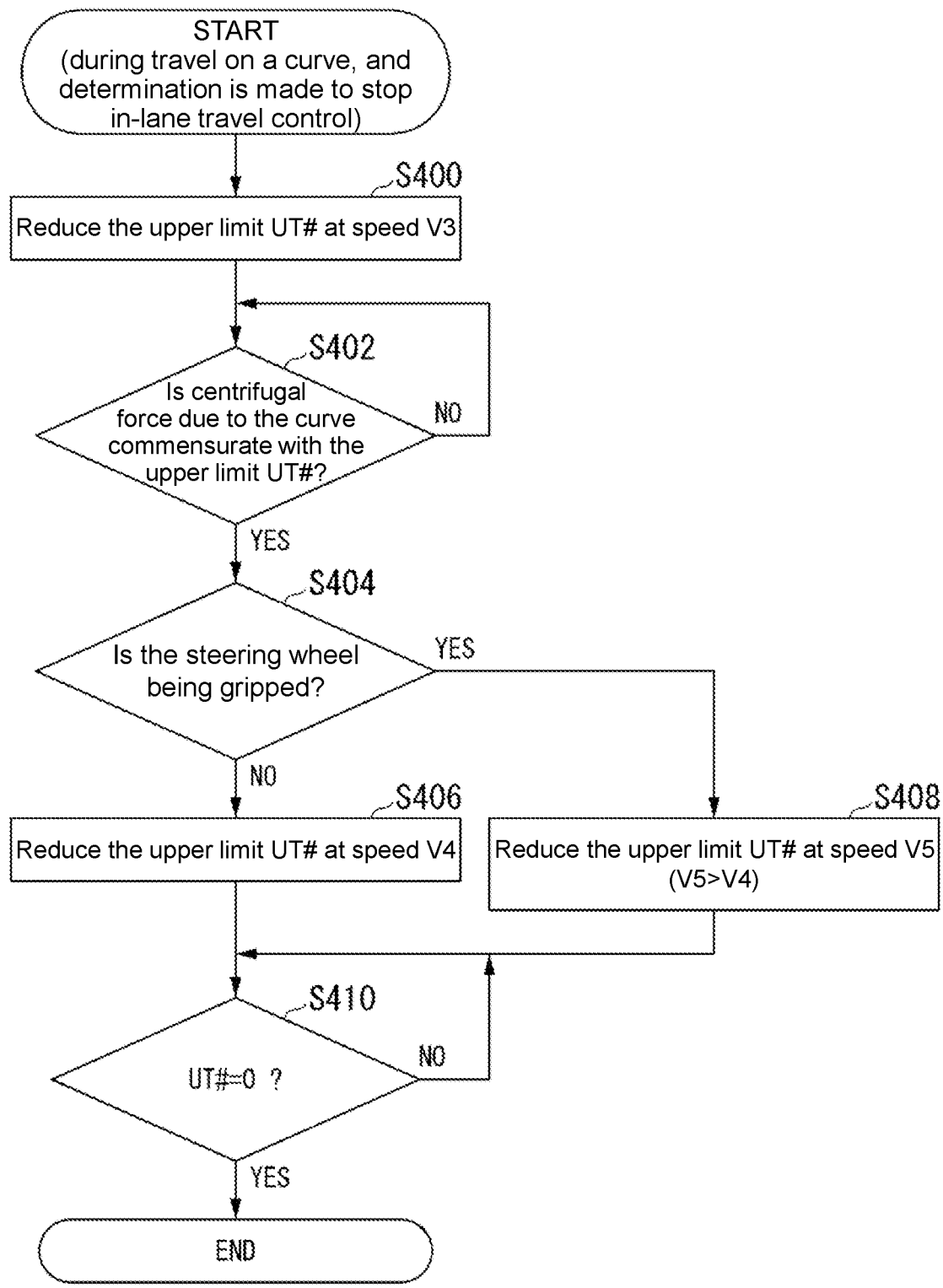
FIG. 11 is a flowchart (No. 4) showing an example of a flow of processing executed by the automatic driving control device 100 of the first embodiment.

FIG. 11 is a flowchart (No. 4) showing an example of a flow of processing executed by the automatic driving control device 100 of the first embodiment. The processing of the present flowchart is started when the host vehicle M is traveling on a curve and the in-lane travel control part 142 decides to stop the in-lane travel control.

Firstly, the upper limit adjustment part 144 starts to reduce the upper limit UT# at the reduction speed V3 (step S400). Next, the upper limit adjustment part 144 determines whether the centrifugal force due to the curve is commensurate with the upper limit UT# (step S402). If it is determined that the centrifugal force due to the curve is commensurate with the upper limit UT#, the upper limit adjustment part 144 determines whether the occupant is gripping the steering wheel 82 (step S404).

If it is determined that the occupant is not gripping the steering wheel 82, the upper limit adjustment part 144 starts to reduce the upper limit UT# at the reduction speed V4 (step S406). If it is determined that the occupant is gripping the steering wheel 82, the upper limit adjustment part 144 starts to reduce the upper limit UT# at the reduction speed V5 (step S408). Then, the upper limit adjustment part 144 waits for the upper limit UT# to fall and reach zero (step S410), and ends the processing of the present flowchart.

In the case of performing such an action, if the in-lane travel control part 142 decides to stop the in-lane travel control when the host vehicle M is not traveling on a curve, the action in the upper limit adjustment (3) may or may not be performed.

According to the first embodiment described above, since an acquisition part (the recognition part 130) that acquires a positional relationship between the host vehicle M and a lane, a control part (the in-lane travel control part 142 and the steering control part 166) that performs the in-lane travel control that causes an actuator (the assist motor 224) included in the steering device 220 of the host vehicle M to output a force for causing the host vehicle M to travel in the lane within a range not exceeding the upper limit UT# based on the positional relationship, and the upper limit adjustment part 144 that changes the upper limit UT# in response to application of a force to an operator (the steering wheel 82) that accepts a steering operation performed by an occupant of the host vehicle M are provided, vehicle behavior that reliably reflects the occupant's intention can be generated.

In addition, according to the first embodiment described above, since the acquisition part (the recognition part 130) that acquires the positional relationship between the host vehicle M and the lane, the control part (the in-lane travel control part 142 and the steering control part 166) that performs the in-lane travel control that causes the actuator (the assist motor 224) included in the steering device 220 of the host vehicle M to output the force for causing the host vehicle M to travel in the lane within the range not exceeding the upper limit UT# based on the positional relationship, and the upper limit adjustment part 144 that adjusts the upper limit UT# in a predetermined case and switches a change rate of the upper limit UT# according to a change of state of the operator (the steering wheel 82) that accepts the steering operation performed by the occupant of the host vehicle M are provided, the change rate of the upper limit can be appropriately adjusted.

Second Embodiment

Hereinafter, the second embodiment of the disclosure is described. In the first embodiment, the vehicle control device is assumed to carry out the in-lane travel control as part of the automatic driving control. However, in the second embodiment, the vehicle control device carries out the in-lane travel control as part of driving support control based on manual driving.

Figure 12:
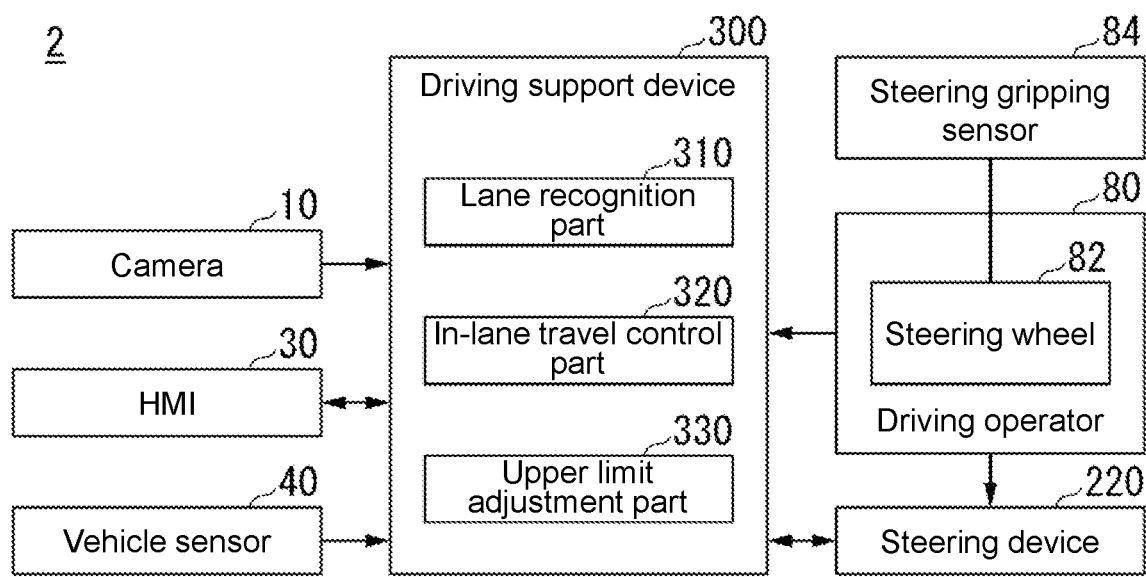
FIG. 12 is a configuration diagram of a vehicle system 2 utilizing a vehicle control device according to a second embodiment.

FIG. 12 is a configuration diagram of a vehicle system 2 utilizing a vehicle control device according to the second embodiment. A vehicle on which the vehicle system 2 is installed may be the same as that of the first embodiment. Hereinafter, the same configurations as those of the first embodiment are denoted by the same reference numerals as those of the first embodiment, and repeated descriptions are omitted. The vehicle system 2 includes a driving support device 300. The devices or machines shown in the figure are connected to each other by a multiplex communication line such as a controller area network (CAN) communication line or a serial communication line, a wireless communication network, or the like. The configuration shown in FIG. 12 is merely an example. A part of the configuration may be omitted or another configuration may be added.

The driving support device 300 includes, for example, a lane recognition part 310, an in-lane travel control part 320, and an upper limit adjustment part 330. These components are realized by, for example, a hardware processor such as a CPU executing a program (software). In addition, some or all of these components may be realized by hardware (circuit part, including circuitry) such as an LSI circuit or an ASIC, an FPGA, or a GPU, or may be realized by collaboration between software and hardware. The program may be stored in advance in a storage device (a storage device including a non-transitory storage medium) such as an HDD or a flash memory of the automatic driving control device 100, or may be stored in a removable storage medium such as a DVD or a CD-ROM, and installed in the HDD or the flash memory of the automatic driving control device 100 by attachment of the storage medium (non-transitory storage medium) to a drive device. The driving support device 300 is another example of the "vehicle control device."

Similarly to the recognition part 130 in the first embodiment, the lane recognition part 310 recognizes the lane (traveling lane) in which the host vehicle M is traveling or the road lane marking.

The in-lane travel control part 320 determines the target steering angle θ# based on the degree of deviation between the position of the host vehicle M and the lane center, and outputs the determined target steering angle θ# to the steering ECU 230 of the steering device 220. For example, the in-lane travel control part 320 determines the target steering angle θ# so that the greater the degree of deviation between the position of the host vehicle M and the lane center, the greater the target steering angle θ# in a direction opposite to the deviation. Alternatively (or additionally), the in-lane travel control part 320 may determine the target steering angle θ# in a direction away from the road lane marking as the position of the host vehicle M approaches the road lane marking.

The upper limit adjustment part 330 adjusts the upper limit UT# in the same manner as the upper limit adjustment part 144 of the first embodiment, and the repeated description is omitted.

Based on the degree of deviation between the position of the host vehicle M and the lane center, the driving support device 300 in the second embodiment may output steering reaction force to the assist motor 224, or may output both the steering reaction force and a spontaneous steering force (the force based on the degree of deviation between the position of the host vehicle M and the lane center described in the first embodiment or above) to the assist motor 224. The steering reaction force is not the spontaneous steering force as described in the first embodiment, but refers to a force that is output up to a force of the same magnitude and in an opposite direction to the force detected by the steering torque sensor 222. The upper limit UT# in this case may be an upper limit of the steering reaction force, or may be an upper limit of a sum of the steering reaction force and the spontaneous steering force.

According to the second embodiment described above, since the acquisition part (the lane recognition part 310) that acquires the positional relationship between the host vehicle M and the lane, the control part (the in-lane travel control part 320 and the steering ECU 230) that performs the in-lane travel control that causes the actuator (the assist motor 224) included in the steering device 220 of the host vehicle M to output the force for causing the host vehicle M to travel in the lane within the range not exceeding the upper limit UT# based on the positional relationship, and the upper limit adjustment part 330 that changes the upper limit UT# in response to an input to the operator (the steering wheel 82) that accepts the steering operation performed by the occupant of the host vehicle M are provided, vehicle behavior that reliably reflects the occupant's intention can be generated.

In addition, according to the second embodiment described above, since the acquisition part (the lane recognition part 310) that acquires the positional relationship between the host vehicle M and the lane, the control part (the in-lane travel control part 320 and the steering ECU 230) that performs the in-lane travel control that causes the actuator (the assist motor 224) included in the steering device 220 of the host vehicle M to output the force for causing the host vehicle M to travel in the lane within the range not exceeding the upper limit UT# based on the positional relationship, and the upper limit adjustment part 330 that adjusts the upper limit UT# in a predetermined case and switches the change rate of the upper limit UT# according to a change of state of the operator (the steering wheel 82) that accepts the steering operation performed by the occupant of the host vehicle M are provided, the change rate of the upper limit can be appropriately adjusted.

The embodiments described above can be expressed as follows:

A vehicle control device including: a storage device storing a program; and a hardware processor, in which the vehicle control device is configured so that: by the hardware processor executing the program stored in the storage device, a positional relationship between a vehicle and a lane is acquired; in-lane travel control that causes an actuator included in a steering device of the vehicle to output a force for causing the vehicle to travel in the lane within a range not exceeding an upper limit is performed based on the positional relationship; the upper limit is changed in response to an input to an operator that accepts a steering operation performed by an occupant of the vehicle.

The embodiments described above can also be expressed as follows:

A vehicle control device including: a storage device storing a program; and a hardware processor, in which the vehicle control device is configured so that: by the hardware processor executing the program stored in the storage device, a positional relationship between a vehicle and a lane is acquired; in-lane travel control that causes an actuator included in a steering device of the vehicle to output a force for causing the vehicle to travel in the lane within a range not exceeding an upper limit is performed based on the positional relationship; the upper limit is adjusted in a predetermined case; a change rate of the upper limit is switched in response to a change of state of an operator that accepts a steering operation performed by an occupant of the vehicle.

Although the embodiments for carrying out the disclosure have been described above by way of embodiments, the disclosure is not limited to these embodiments at all, and various modifications and replacements may be made without deviating from the gist of the disclosure.

What is claimed is:

1. A vehicle control device comprising:
   a processor,
   acquiring a positional relationship between a vehicle and a lane,
   performing in-lane travel control that causes an actuator comprised in a steering device of the vehicle to output a force for causing the vehicle to travel in the lane within a range not exceeding an upper limit based on the positional relationship, and
   changing the upper limit in response to an input to an operator that accepts a steering operation performed by an occupant of the vehicle,
   wherein the processor acquires information indicating a gripping state of the operator by the occupant of the vehicle, and is able to execute non-gripping mode control in which the in-lane travel control is performed in a non-gripping state in which the occupant of the vehicle does not grip the operator,
   wherein when the processor is executing the non-gripping mode control, the processor reduces a reduction rate of the upper limit as compared with when the processor performs the in-lane travel control in the gripping state in which the occupant of the vehicle grips the operator.

2. The vehicle control device according to claim 1, wherein
   the processor reduces the upper limit to be lower than a specified value in response to the input exceeding a threshold to the operator.

3. The vehicle control device according to claim 2, wherein
the processor increases a reduction amount of the upper limit as the input to the operator exceeds the threshold and increases.

4. The vehicle control device according to claim 3, wherein
the processor stops the actuator comprised in the steering device of the vehicle from outputting the force in response to the upper limit being reduced to be equal to or lower than a lower limit.

5. The vehicle control device according to claim 1, wherein
the processor reduces the upper limit to be lower than a specified value in response to the input exceeding a threshold to the operator;
the processor does not start the non-gripping mode control in a state in which the upper limit is lower than the specified value.

6. The vehicle control device according to claim 1, wherein
when a road lane marking is unable to be recognized when the processor acquires the positional relationship between the vehicle and the lane, the processor reduces the upper limit to be less than that when the road lane marking is able to be recognized.

7. A vehicle control method comprising:
by a vehicle control device:
acquiring a positional relationship between a vehicle and a lane;
performing in-lane travel control that causes an actuator comprised in a steering device of the vehicle to output a force for causing the vehicle to travel in the lane within a range not exceeding an upper limit based on the positional relationship; and
changing the upper limit in response to an input to an operator that accepts a steering operation performed by an occupant of the vehicle,
wherein the vehicle control method further comprises acquiring information indicating a gripping state of the operator by the occupant of the vehicle, and executing non-gripping mode control in which the in-lane travel control is performed in a non-gripping state in which the occupant of the vehicle does not grip the operator,
wherein when the non-gripping mode control is executed, a reduction rate of the upper limit is reduced as compared with when the processor performs the in-lane travel control in the gripping state in which the occupant of the vehicle grips the operator.

8. A non-transitory storage medium, storing a program causing a processor of a vehicle control device to execute:
acquiring a positional relationship between a vehicle and a lane;
performing in-lane travel control that causes an actuator comprised in a steering device of the vehicle to output a force for causing the vehicle to travel in the lane within a range not exceeding an upper limit based on the positional relationship; and
changing the upper limit in response to an input to an operator that accepts a steering operation performed by an occupant of the vehicle,
wherein the processor further executes: acquiring information indicating a gripping state of the operator by the occupant of the vehicle, and executing non-gripping mode control in which the in-lane travel control is performed in a non-gripping state in which the occupant of the vehicle does not grip the operator,
wherein when the processor is executing the non-gripping mode control, the processor reduces a reduction rate of the upper limit as compared with when the processor performs the in-lane travel control in the gripping state in which the occupant of the vehicle grips the operator.

* * * * *